Dec. 5, 1961 G. E. PITTSENBARGER 3,011,253
CABLE CLAMP
Filed April 23, 1958
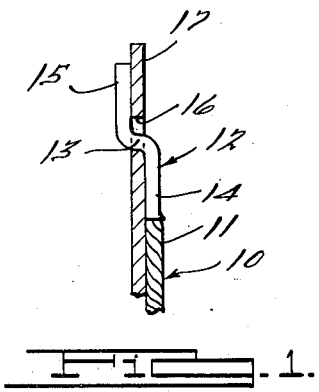
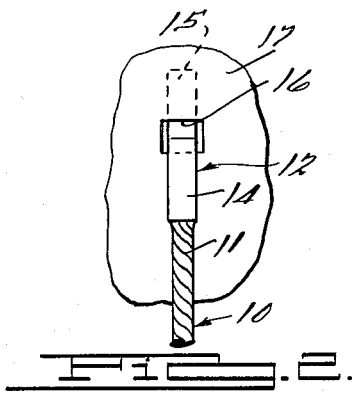
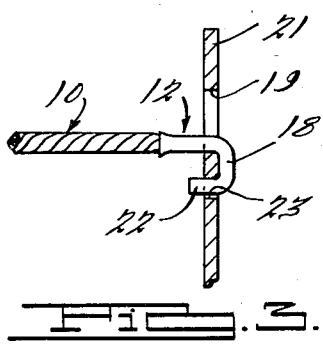
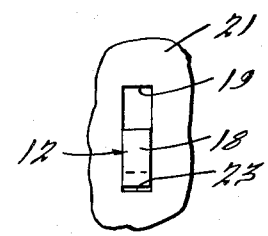
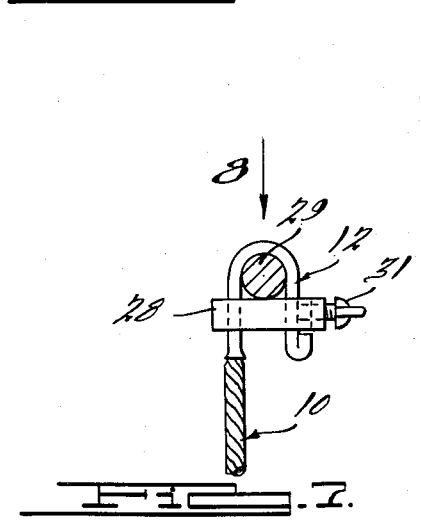
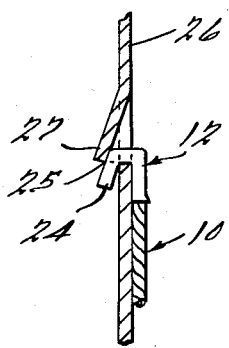
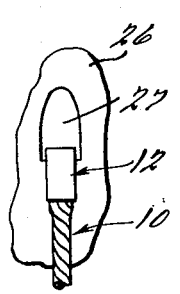
INVENTOR.
George E. Pittsenbarger
BY
Harness, Dickey & Pierce
ATTORNEYS.

United States Patent Office 3,011,253
Patented Dec. 5, 1961

3,011,253
CABLE CLAMP
George E. Pittsenbarger, Detroit, Mich., assignor to American Metal Products Company, Detroit, Mich., a corporation of Michigan
Filed Apr. 23, 1958, Ser. No. 730,333
1 Claim. (Cl. 29—469)

This invention pertains to cable securing means, and particularly to a terminal end for a cable by which it may be secured in fixed position.

Difficulty has been experienced heretofore in securing cable ends. Plates having grooves therein for receiving the cables have been employed heretofore for securing a cable when bolts were tightened to secure the plates and cable in fixed relation. Various types of jaw clamps have been utilized for the ends of the cable and for forming a loop on the cable end. In these types of constructions, difficulty was experienced because of lack of uniformity in stressing the strands of the cable which caused some to break before the others. The weakest point of the assembly was the cable portion in the securing clamps and this usually failed at a load much lower than that for which the cable was rated.

In practicing the present invention, it was found that when the strands of the cables were confined within a tube and the tube was flattened and properly shaped relative to a supporting element, the tube was prevented from straightening and the cable from moving therein. In this manner, a holding means was provided for the cable end which has proved to be much stronger than the body of the cable itself. A tube was employed which was placed over the end of the cable and flattened sufficiently to compress the cable strands. The end was then bent into a shape conforming to the manner in which the end was to be secured. In one arrangement, a left and a right angle bend were made in the assembled tube to have one portion disposed in parallel extension of another portion and spaced apart approximately the thickness of a plate to which the cable is to be secured. When the end portion of the bent tube projected through an aperture in the plate, the two portions of the tube engaged opposite surfaces thereof and successfully anchored the cable for supporting a load parallel to the plate. It was found that the cable would break at a point remote from the end outside of the tube when the cable was overloaded. The tube could be bent into U-shape so that it could pass through an elongated aperture in the plate and then moved laterally and pulled forwardly to have the free end extend through an adjacent aperture to thereby form an anchor for the cable which permitted it to be loaded at right angle to the plate, with the end locked against movement. The tubular element could be bent into other shapes to conform to the type of anchor desired for the cable.

Accordingly, the main objects of the invention are: to provide a terminal end for a cable which is capable of anchoring the cable when it is inserted in an aperture; to compress a tube on the cable end portion and bend the tube and cable end at right angle so as to securely retain the relationship between the cable and the flattened tube; to flatten a tube on a cable and form it in a manner to permit it to be inserted through an aperture in a plate to securely anchor the tube and the cable end thereto, and, in general, to provide a terminal end for a cable which is simple in construction, positive in operation and economical of manufacture.

Other objects and features of novelty of the invention will be specifically pointed out or will become apparent when referring, for a better understanding of the invention, to the following description taken in conjunction with the accompanying drawing, wherein:

FIGURE 1 is a sectional view of a cable end enclosed by a tube embodying features of the present invention;

FIG. 2 is a view in elevation of the cable end illustrated in FIG. 1;

FIG. 3 is a view of a cable end, similar to that illustrated in FIG. 1, showing another form which the invention may assume;

FIG. 4 is a plan view of the structure illustrated in FIG. 3, taken on the line 4—4 thereof;

FIG. 5 is a sectional view of structure, similar to that illustrated in FIG. 1, showing another form of anchoring means for a cable;

FIG. 6 is a broken plan view of the structure illustrated in FIG. 5;

FIG. 7 is a sectional view of structure, similar to that illustrated in FIG. 1, showing another anchoring means for the cable; and FIG. 8 is a plan view of the structure illustrated in FIG. 7, as viewed from the line 8 thereof.

In FIG. 1 a cable 10 is illustrated made from a number of strands of wire 11 and having on the end thereof a tube 12 which has both sides flattened upon the cable stands to compress them therebetween. The tube is bent into S form in the plane of the flat sides. The tube is divided into two portions 14 and 15 by the right angle bends 13 which form holding means for the cable. The end 14 is passed through an aperture 16 in a plate 17 to engage the inner face of the plate while the portion 15 engages the outer face thereof. With this arrangement, the cable end supports a load parallel to the plate in such manner that the cable will rupture outside of the tube portion when the cable is overload.

In FIG. 3 the cable 10 is illustrated as having its end disposed in a tube 12 which is flattened upon the strands thereof and bent into U-shape at 18. The U-shaped end is advanced through an aperture 19 in a plate 21, dropped downwardly and pulled forwardly to have the end 22 extend within an aperture 23 in the plate. In this arrangement, the cable may be pulled at right angle to the plate with a force which would break the cable outside of the U-shaped terminal end portion 12 without damaging the end portion. The end 22 within the aperture 23 prevents the U-shaped portion from straightening out and permits the strands to move from the tube.

A similar form of terminal end is illustrated in FIGS. 5 and 6 wherein the cable 10 has the tube 12 placed thereover and flattened onto the strands of the cable and thereafter bent into U-shape having an end 24 at a slight angle to the cable portion. When extended into an aperture 25 in a plate 26, the end 24 will be prevented from straightening out by its engagement with the lanced portion 27 of the plate.

A further form of the invention applied to a cable end is illustrated in FIGS. 7 and 8. The cable 10 has the flattened tube 12 on its end formed into U-shape. An O-shaped clamp 28 is slid over the U-shaped end portion and the cable 10 so that the U-shaped portion may be placed over a rod 29. Thereafter, the clamp 28 is moved onto the legs of the U-shaped portion and tightened by a screw 31. This prevents the U-shaped portion from straightening out when the cable 10 is loaded to thereby prevent the strands from moving from the tube.

From the various forms illustrated herein into which the compressed tube may be shaped, it will be apparent to one skilled in the art that the confined cable end may be shaped in many ways to form holding means for the cable. These various forms will be suggested by the manner in which the cable is to be secured, the shape of the element to which it is to be attached and the direction in which the cable is to be loaded.

The basic concept of the present invention is to bend the tube compressed upon the strands therewithin to uniformly support the strands and prevent the strands from pulling out of the tube. The end is so mounted as to prevent the tube from straightening and the strands are retained in position therein and uniformly loaded so that any breaking thereof will occur outside of the supporting end when the cable is overloaded.

What is claimed is:

The method of securing the end of a metal stranded cable of cylindrical form to an element having an aperture therethrough which includes the steps of: snugly fitting a cylindrical metal tube over and in direct engagement with the cylindrical metal stranded end of the cable, flattening both the tube and cable end substantially uniformly throughout the length of the tube to reduce the cross-sectional area of the tube and cable end so that the tube tightly clinches the cable end, bending the tightly clinched tube and cable into substantially S-shape, and inserting the S-shaped end through the aperture with the central portion disposed therein and the portions each side thereof engaging opposite faces of the element for securing the cable within the S-shaped end and locking the S-shaped end into the aperture of the element.

References Cited in the file of this patent

UNITED STATES PATENTS

| | | |
|---|---|---|
| 793,758 | Woodman | July 4, 1905 |
| 1,115,204 | Jeffords | Oct. 27, 1914 |
| 2,050,855 | Oppenheim | Aug. 11, 1936 |
| 2,881,496 | Wernsing | Apr. 14, 1959 |

FOREIGN PATENTS

| | | |
|---|---|---|
| 335,686 | Germany | Apr. 11, 1921 |